US006985323B2

(12) United States Patent
Magnusson et al.

(10) Patent No.: US 6,985,323 B2
(45) Date of Patent: Jan. 10, 2006

(54) ALTERNATING-AZIMUTH ANGLE HELICAL TRACK FORMAT USING GROUPED SAME-AZIMUTH ANGLE HEADS

(75) Inventors: Steven L. Magnusson, Boulder, CO (US); Timothy C. Hughes, Boulder, CO (US)

(73) Assignee: Exabyte Corporation, Boulder, CO (US)

( * ) Notice: Subject to any disclaimer, the term of this patent is extended or adjusted under 35 U.S.C. 154(b) by 523 days.

(21) Appl. No.: 10/131,499

(22) Filed: Apr. 25, 2002

(65) Prior Publication Data

US 2003/0048563 A1 Mar. 13, 2003

Related U.S. Application Data

(60) Provisional application No. 60/286,012, filed on Sep. 12, 2001.

(51) Int. Cl.
G11B 15/14 (2006.01)
(52) U.S. Cl. .......................... 360/64; 360/57
(58) Field of Classification Search ............... 360/64, 360/271.1, 55, 75
See application file for complete search history.

(56) References Cited

U.S. PATENT DOCUMENTS

| | | | |
|---|---|---|---|
| 4,835,628 A | 5/1989 | Hinz et al. | |
| 4,843,495 A | 6/1989 | Georgis et al. | |
| 4,845,577 A | 7/1989 | Georgis et al. | |
| 4,868,692 A | 9/1989 | Nakase et al. | |
| 5,050,018 A | 9/1991 | Georgis et al. | |
| 5,065,261 A | 11/1991 | Hughes et al. | |
| 5,068,757 A | 11/1991 | Hughes et al. | |
| 5,142,422 A | 8/1992 | Zook et al. | |
| 5,191,491 A | 3/1993 | Zweighaft | |
| 5,313,346 A | 5/1994 | Shimotashiro et al. | |

(Continued)

OTHER PUBLICATIONS

U.S. Appl. No. 09/761,658, filed Jan. 18, 2001, entitled Phase Based Time Domain Tracking for Helical Scan Tape Drive.

(Continued)

Primary Examiner—David Hudspeth
Assistant Examiner—Daniell L. Negrón
(74) Attorney, Agent, or Firm—Nixon & Vanderhye, P.C.

(57) ABSTRACT

A helical scan tape recorder (30) comprises a rotatable scanner (85) upon which is mounted a first set of plural transducing heads (W1, W3) and a second set of transducing heads (W2, W4). A transport system transports magnetic tape (31) proximate the rotatable scanner in a manner so that information is transduced by at least one of the transducing heads during a revolution of the scanner. The sets of transducing heads are so mounted on the scanner with respect to azimuthal orientation of the transducing heads that all tracks transduced by the transducing heads have a desired width regardless of an error in physical distance separating the sets of transducing heads. In one aspect, the first set of plural transducing heads comprises a first head (W1) and a third head (W3), and the second set of plural transducing heads comprises a second head (W2) and a fourth head (W4). The sets of transducing heads are mounted on the scanner so the first head and the third head transduce respective tracks during a first angular phase of the rotation of the scanner, and so that the second head and the fourth head transduce, during a second angular phase of the rotation of the scanner, respective tracks which partially overlap a previously-transduced track. The tracks on the tape alternate according to differing azimuthal orientation.

32 Claims, 10 Drawing Sheets

U.S. PATENT DOCUMENTS

| | | |
|---|---|---|
| 5,325,246 A | 6/1994 | Guisinger et al. |
| 5,459,617 A * | 10/1995 | Yanagihara ............... 360/21 |
| 5,535,068 A | 7/1996 | Hughes |
| 5,602,694 A | 2/1997 | Miles et al. |
| 5,680,269 A | 10/1997 | Georgis et al. |
| 5,689,382 A | 11/1997 | Hughes |
| 5,726,826 A | 3/1998 | Miles et al. |
| 5,731,921 A | 3/1998 | Hughes et al. |
| 5,734,518 A | 3/1998 | Hughes |
| 5,953,177 A | 9/1999 | Hughes |
| 5,973,875 A | 10/1999 | Hughes et al. |
| 5,978,165 A | 11/1999 | Magnusson |
| 6,144,518 A | 11/2000 | Magnusson |
| 6,154,332 A * | 11/2000 | Yanagawa et al. ............ 360/64 |
| 6,288,864 B1 | 9/2001 | Widener et al. |
| 6,542,322 B2 * | 4/2003 | Maemine ..................... 360/64 |
| 2002/0071195 A1 | 6/2002 | Magnusson |
| 2003/0234998 A1 | 12/2003 | Magnusson |

OTHER PUBLICATIONS

U.S. Appl. No. 09/492,345, filed Jan. 27, 2000, entitled "Power Supply Circuit and Method of Calibration Therefor".

U.S. Appl. No. 10/847,655 filed May 18, 2004 by Steve L. Magnusson, entitled "Multi-Plane Thin-Film Heads".

* cited by examiner

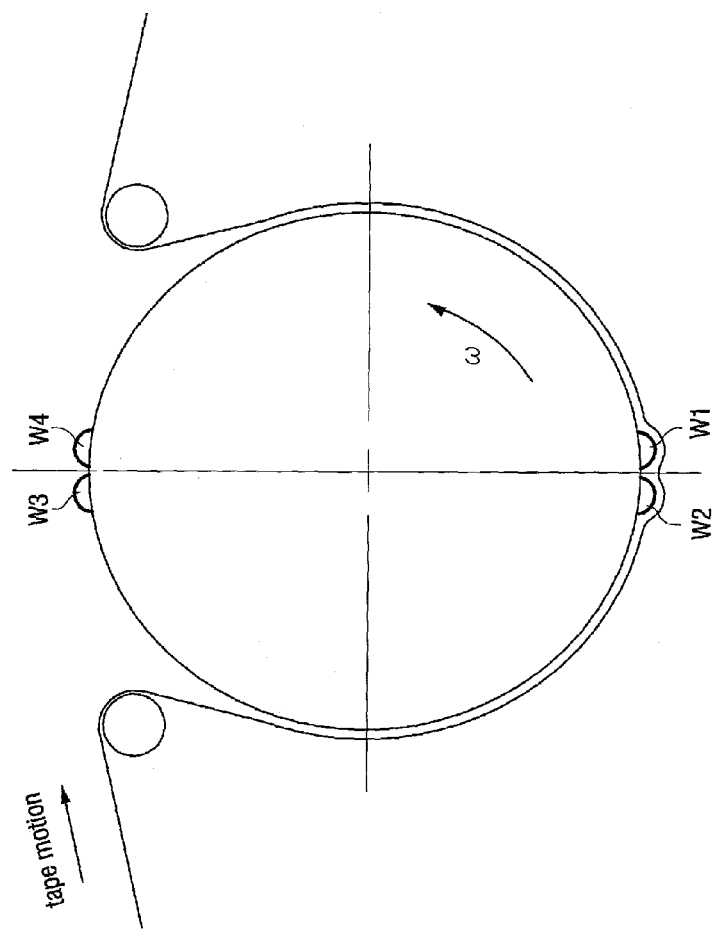
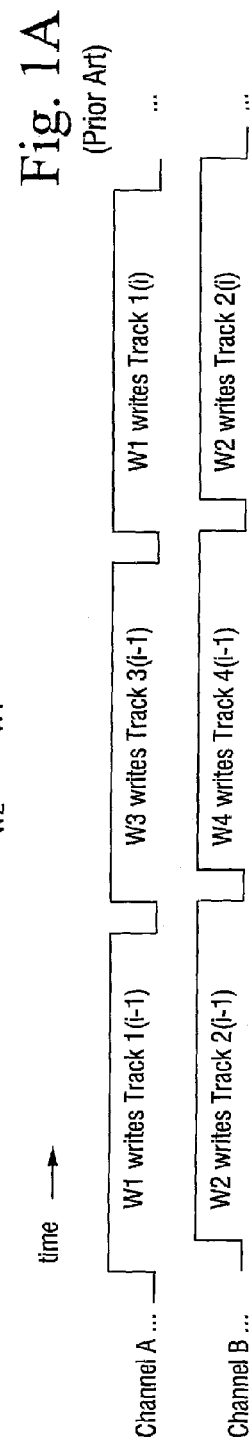

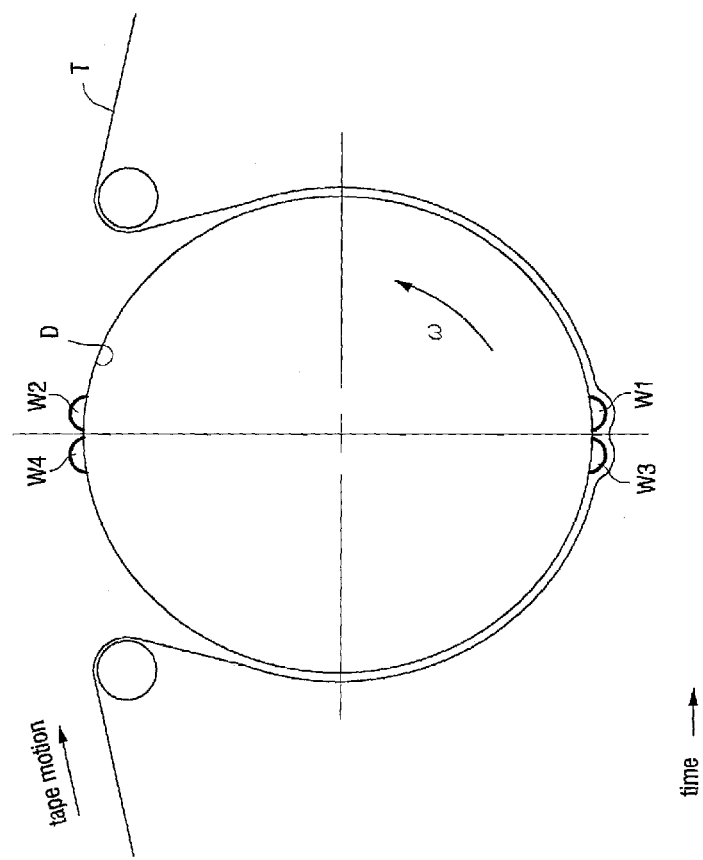
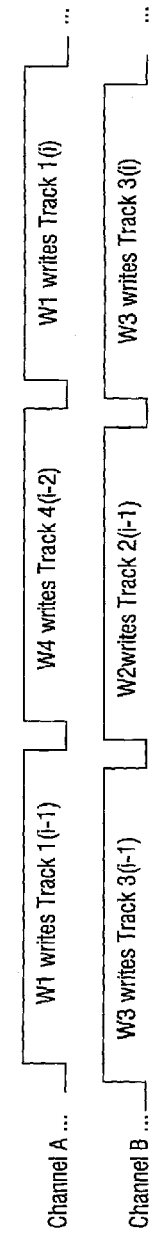
Fig. 7
Fig. 7A

ALTERNATING-AZIMUTH ANGLE HELICAL TRACK FORMAT USING GROUPED SAME-AZIMUTH ANGLE HEADS

This application claims the priority and benefit of U.S. Provisional patent application No. 60/286,012, filed Apr. 25, 2001, which is incorporated herein by reference in its entirety.

BACKGROUND

1. Field of the Invention

The present invention pertains to magnetic recording, and particularly to apparatus which record/reproduce an alternating-azimuth recorded track pattern on magnetic tape.

2. Related Art and Other Considerations

Examples of helical scan apparatus (e.g., helical scan tape drives), including examples which have alternating-azimuth track patterns, are described in the following non-exhaustive and exemplary list of United States patents, all of which are incorporated herein by reference in their entirety: U.S. Pat. No. 5,065,261; U.S. Pat. No. 5,068,757; U.S. Pat. No. 5,142,422; U.S. Pat. No. 5,191,491; U.S. Pat. No. 5,535,068; U.S. Pat. No. 5,602,694; U.S. Pat. No. 5,680,269; U.S. Pat. No. 5,689,382; U.S. Pat. No. 5,726,826; U.S. Pat. No. 5,731,921; U.S. Pat. No. 5,734,518; U.S. Pat. No. 5,953,177; U.S. Pat. No. 5,973,875; U.S. Pat. No. 5,978,165; U.S. Pat. No. 6,144,518; and, U.S. Pat. No. 56,288,864.

Alternating-azimuth track patterns have been routinely used in both analog (e.g., VHS, Betamax, etc.) and digital helical tape recording format since the mid 1970s. Examples of digital helical tape recording formats are D-2, DCT, D-3, 850X, and Mammoth™. In all of these alternating-azimuth helical recording formats, the tracks are recorded in a sequentially overlapping fashion in both time and space: a "+" azimuth track, followed by a "−" azimuth track, followed by a "+" azimuth track, followed by a "−" azimuth track, etc.

FIG. 1 shows an example of the Mammoth-2 helical scanner architecture which uses this sequential (prior art) recording method. The four write heads (W1, W2, W3, W4) mounted on the periphery of a rotatable drum or "scanner" are grouped into two local modules of two heads each (a first module with heads W1, W2; a second module with heads W3, W4). The two modules are separated by 180°. Since the recorded track length corresponds to about 180° of the drum's rotation, the signals for the four write heads can be efficiently supplied by only two signal channels. The timing of the signals for the respective write heads W1, W2, W3, and W4 are as shown in FIG. 1A.

FIG. 2 shows a view of the magnetic tape surface for a helical scan tape drive known as Mammoth™-2, and serves to illustrate the "sequential" nature of the time and position relationships of the recorded tracks. In FIG. 2, the W1 head (+ azimuth) is just finishing writing Track 1$i$. The W2 head (− azimuth) is closely following the W1 head while it writes Track 2$i$ in an overlapping fashion. On the scanner, the vertical height from the bottom of the W1 head to the bottom of the W2 head is adjusted nominally such that the W2 head follows a path on the tape the distance "P" above the path of the W1 head as shown in the FIG. 2. The W3 head (+ azimuth) is just at the start of what will become Track 3$i$. The vertical height from the bottom of the W1 head to the bottom of the W3 head is adjusted nominally such that the W3 head follows a path on the tape the distance "2P" above the path of the W1 head. The W4 head (− azimuth) will closely follow the W3 head while it writes Track 4$i$ in an overlapping fashion. The vertical height from the bottom of the W3 head to the bottom of the W4 head is adjusted nominally such that the W4 head follows a path the distance "P" above the W3 head as shown in FIG. 2.

Repeating this process (+ azimuth write, followed by − azimuth write, followed by + azimuth write, followed by − azimuth write, etc.) produces a recording which comprises a series of alternating-azimuth tracks, with each track being of nominal width P.

One problem with the approach described above is that it is difficult to hold the positional relationship between the W1/W2 head module and the W3/W4 head module, particularly since these modules are separated by a relatively large physical distance. When there is an error, "Δ", between the W1/W2 head module and the W3/W4 head module, the recorded track pattern is severely affected as shown in FIG. 3. In this example, the vertical height from the W1 head to the W3 head is such that the W3 head follows a path not 2P, but rather, 2P−Δ from the W1 head path. Consequently, the width of every Track 2 is reduced to P−Δ, and the width of every Track 4 is increased to P+Δ.

What is needed, therefore, and an object of the present invention, is a helical scan drive apparatus and method of operating the same which will transduce tracks of proper width despite a variation or error in separation of the head modules.

BRIEF SUMMARY

A helical scan tape recorder comprises a rotatable scanner upon which is mounted a first set of plural transducing heads and a second set of transducing heads. A transport system transports magnetic tape proximate the rotatable scanner in a manner so that information is transduced by at least one of the transducing heads during a revolution of the scanner. The sets of transducing heads are so mounted on the scanner with respect to azimuthal orientation of the transducing heads that all tracks transduced by the transducing heads have a desired width regardless of an error in physical distance separating heads of a set.

In one aspect, the first set of plural transducing heads comprises a first head and a third head, and the second set of plural transducing heads comprises a second head and a fourth head. The sets of transducing heads are mounted on the scanner so the first head and the third head transduce respective tracks during a first angular phase of the rotation of the scanner. The sets of transducing heads are mounted on the scanner so that the second head and the fourth head transduce, during a second angular phase of the rotation of the scanner, respective tracks which partially overlap a previously-transduced track. The tracks on the tape alternate according to differing azimuthal orientation.

In another aspect, the heads of the first set of transducing heads have a first azimuthal orientation and the heads of the second set of transducing heads have a second azimuthal orientation which is different from the first azimuthal orientation.

Ideally, the sets of transducing heads are mounted on the scanner so the second head transduces a track which preferably resides a distance H below a track transduced by the first head. H=3P+½(P−W1), wherein P is a nominal width of the second head, and wherein W1 is a width of the first head. The fourth head transduces a track which is preferably a distance 2P above the track transduced by the second head.

Thus, a new helical head/scanner physical and timing architecture produces an alternating-azimuth (+, −, +, −, . . . ) recorded track pattern on the tape, but has tracks that are written in a new temporal order: of a "+" azimuth track, followed by another "+" azimuth track, followed by a "−" azimuth track, followed by another "−" azimuth track (and then this pattern repeats). The spatial order of the tracks on the tape is still +, −, +, −, +, etc., and the tracks have essentially a same width regardless of whether the head modules are properly mounted relative to one another.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is diagrammatic view of an example prior art helical scanner architecture which uses a prior art sequential recording method.

FIG. 1A is a diagrammatic view showing signals for a helical scan tape drive having an architecture such as that of FIG. 1.

FIG. 7 is a diagrammatic view showing another illustrative example embodiment of a new scanner architecture.

FIG. 7A is a diagrammatic view showing signals for a helical scan tape drive having an architecture such as that of FIG. 7.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

In one of its aspects, the present invention provides a new helical head/scanner physical and timing architecture which still produces an alternating-azimuth (+, −, +, −, . . . ) recorded track pattern on the tape and still provides an efficient electrical signal structure, yet the recorded track pattern is not adversely affected by a height error between the far-separated groups (modules) of write heads positioned on a scanner or rotating drum. In this new approach, the tracks are written in a new temporal order: a "+" azimuth track, followed by another "+" azimuth track, followed by a "−" azimuth track, followed by another "−" azimuth track (and then this pattern repeats), even though the spatial order of the tracks on the tape is still +, −, +, −, +, etc.

Figure 2:
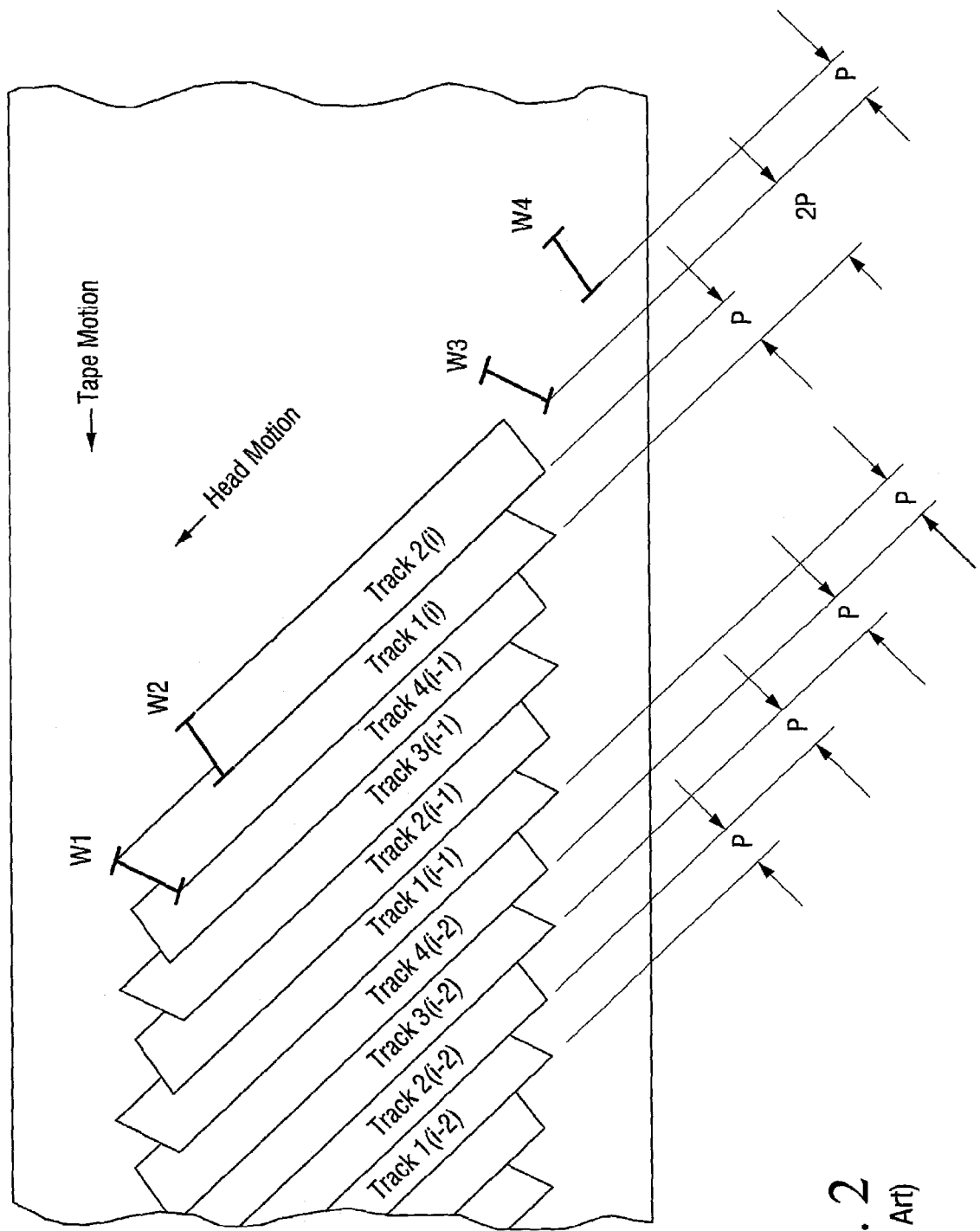
FIG. 2 is a diagrammatic view of a magnetic tape surface for a helical scan tape drive having an architecture such as that of FIG. 1.
Figure 3:
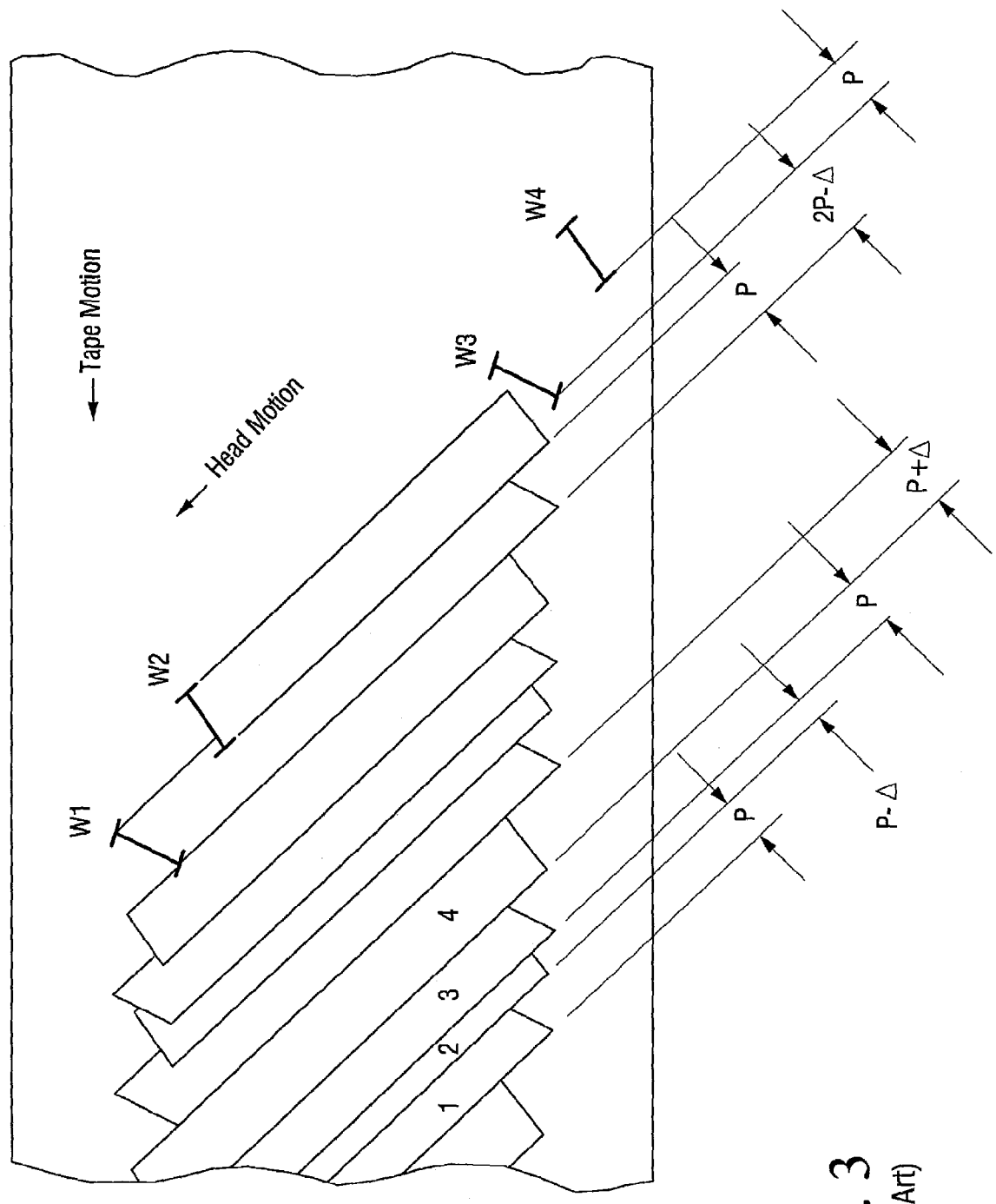
FIG. 3 is a diagrammatic view of a track pattern produced by a prior art tape drive and having a position error between head modules.
Figure 4:
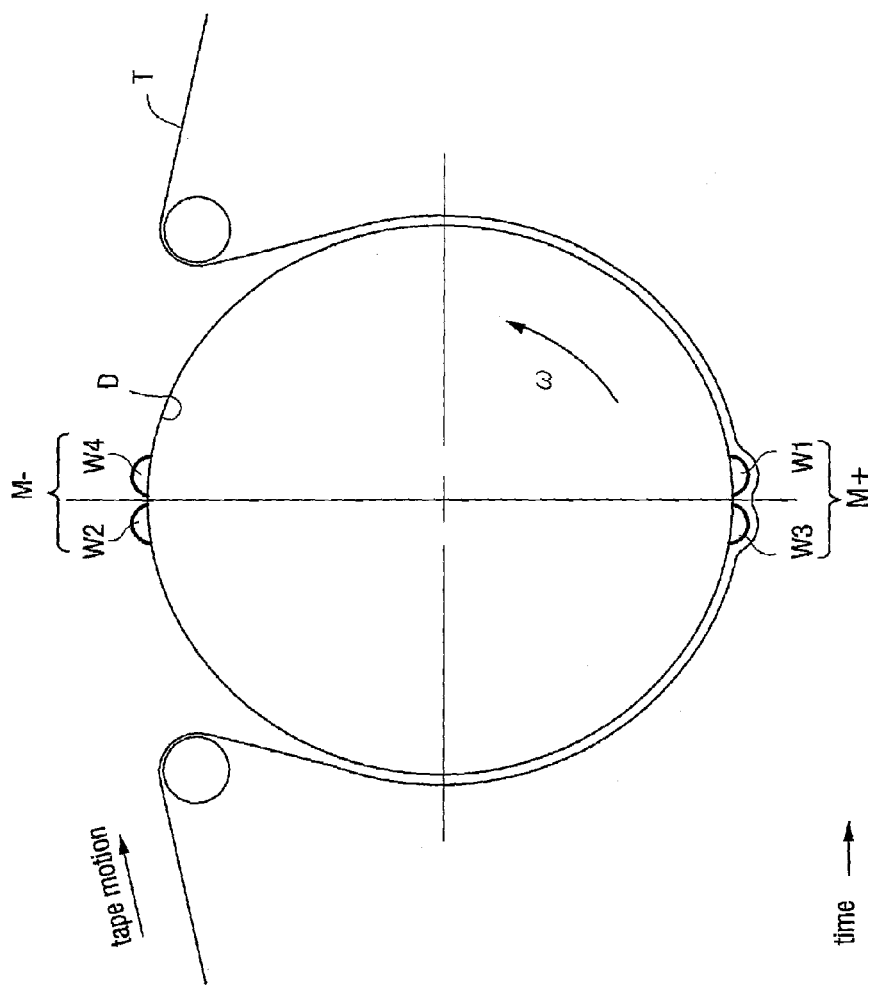
FIG. 4 is a diagrammatic view showing an illustrative example embodiment of a new scanner architecture according to one embodiment.

FIG. 4 shows the new scanner architecture featuring a rotating drum D or "scanner" in which two "+" azimuth write heads, W1 and W3, are in one head group and two "−" azimuth heads, W2 and W4, are in the another group. Each group is also referred to as a set or module, e.g., heads W1 and W3 are in a first set or first module (module $M_+$), while heads W2 and W4 are in a second set or second module (module $M_-$). The nominal width of heads W1 and W3 is shown as slightly less than 2P, but they could be 2P or larger than 2P. The nominal width of heads W2 and W4 is P. In an illustrated embodiment, P can be in a range of from about 3 μm to 10 μm in size.

Figure 4A:
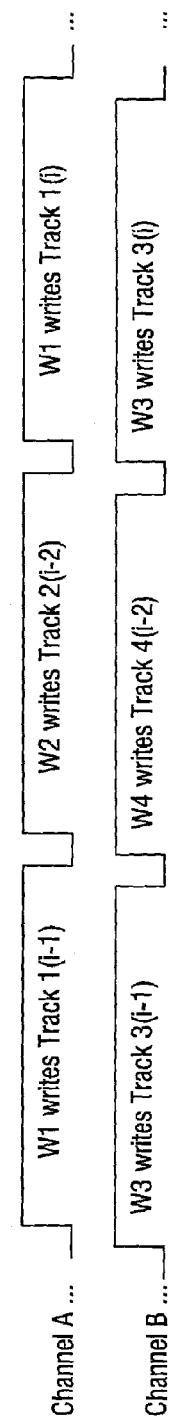
FIG. 4A is a diagrammatic view showing signals for a helical scan tape drive having an architecture such as that of FIG. 4.

The signals for the four write heads can still be efficiently supplied by only two signal channels (e.g., channel A and channel B) as shown in the timing diagram of FIG. 4A. Channel A is employed for the module $M_1$ (e.g., write heads W1, W3); channel B is employed for the module $M_-$ (write heads W2, W4).

A transport system transports magnetic tape T proximate the rotatable scanner or drum D in a manner so that information is transduced by at least one of the transducing heads during a revolution of the scanner. The transport system may be in accordance with any of numerous example implementations, some example non-limiting embodiments thereof being described below. The revolution has a first angular phase or revolution half in which the heads of the first module $M_+$ are in contact with the tape for transducing information, and a second angular phase or revolution half in which the heads of the second module $M_-$ are in contact with the tape for transducing information. Preferably the first angular phase is offset from the second angular phase by essentially one hundred eighty degrees.

Figure 5:
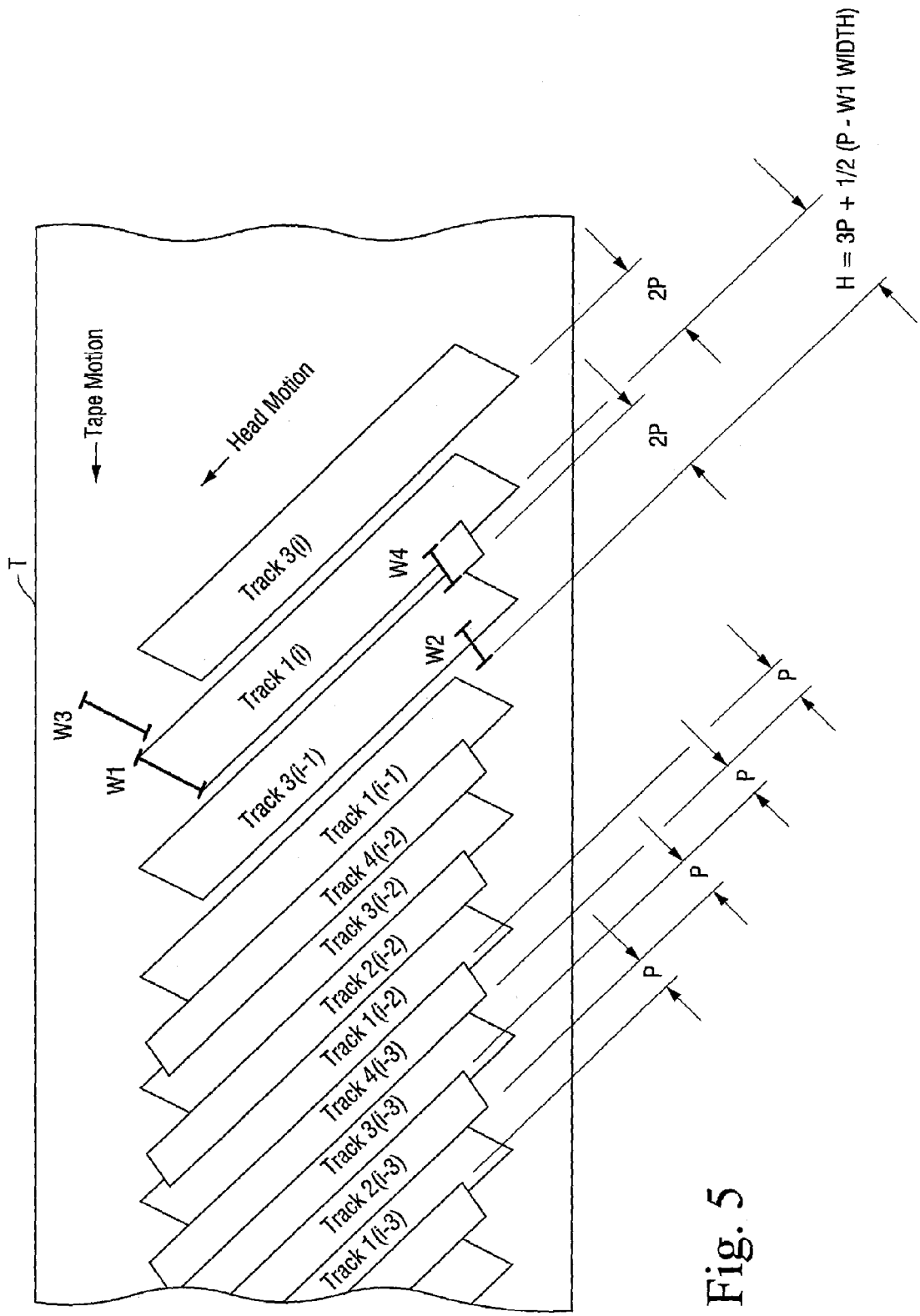
FIG. 5 is a diagrammatic view of a magnetic tape surface for a helical scan tape drive having the new scanner architecture of FIG. 4.

FIG. 5 shows a view of the magnetic tape surface T for the invention illustrating the new sequence of the time and position relationships for the recorded tracks. In FIG. 5, the W1 head (+ azimuth) is just finishing writing Track 1i. The W3 head (+ azimuth) has just previously finished writing Track 3i. On the scanner, the vertical height from the bottom of the W1 head to the bottom of the W3 head on the scanner is adjusted nominally such that the W3 head follows a path on the tape the distance "2P" above the W1 head as shown in the FIG. 5. The W2 head (− azimuth) is just at the start of what will become Track 2(i−1). The vertical height from the bottom of the W1 head to the bottom of the W2 head is adjusted nominally on the scanner such that the W2 head follows a path on the tape the distance "H" below the path of the W1 head, where H=3P+½(P−W1 Width). The W4 head (− azimuth) has started writing Track 4(i−1). The vertical height from the bottom of the W4 head to the bottom of the W2 head is adjusted nominally on the scanner such that the W4 head follows a path the distance "2P" above the W2 head as shown in the FIG. 5.

Repeating this new process (+ azimuth write, followed by + azimuth write, followed by − azimuth write, followed by − azimuth write, etc.) still produces a recording which comprises a series of alternating-azimuth tracks each of nominal width P. With this new approach, it is still difficult to hold the positional relationship between the W1/W3 head module $M_+$ and the W2/W4 head module $M_−$ (since they are separated by a relatively large physical distance as before). However, when now there is an error, "Δ", in the physical distance between the W1/W3 head module $M_+$ and the W2/W4 head module $M_−$, the recorded track pattern is not affected as shown in FIG. 6.

Figure 6:
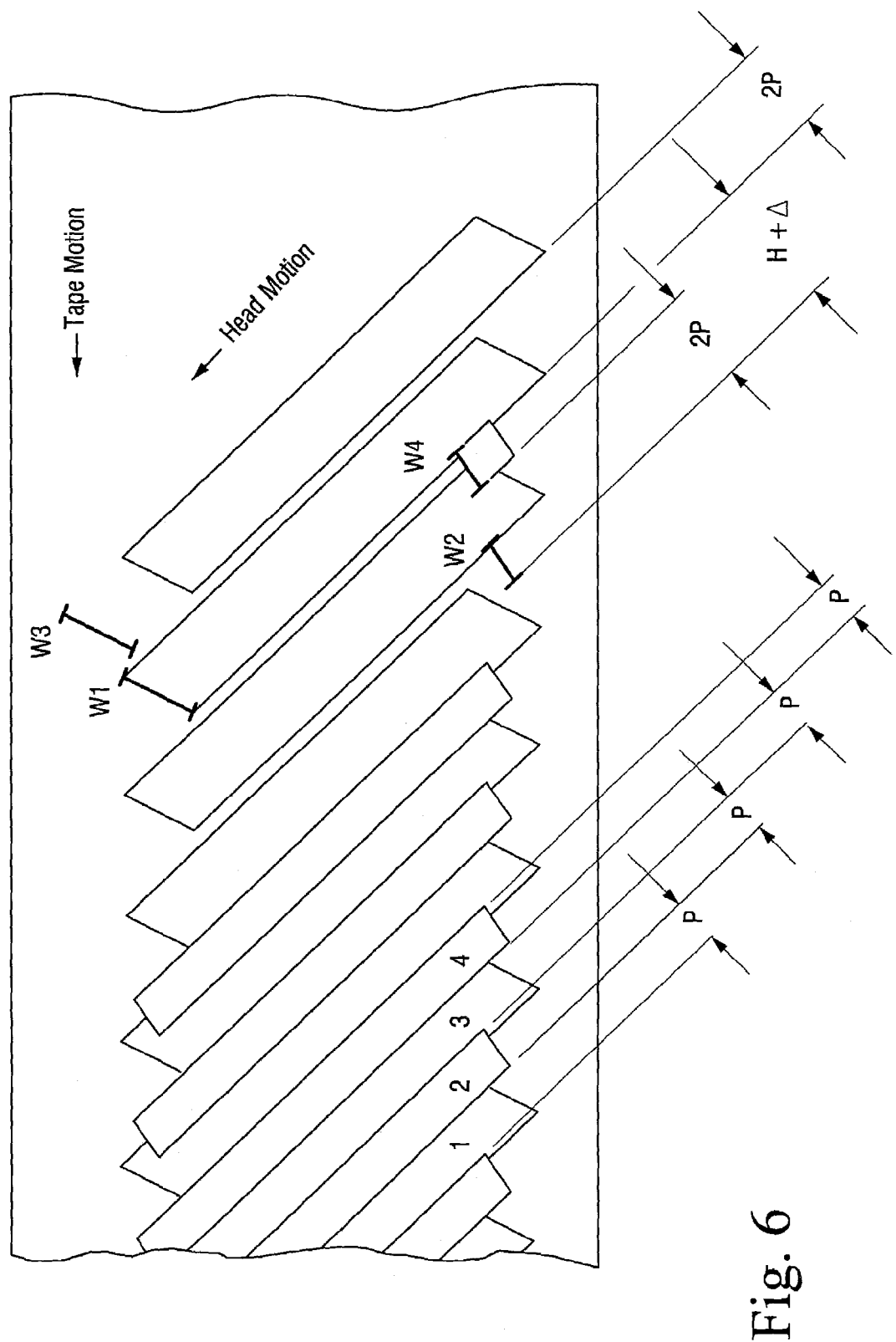
FIG. 6 is a diagrammatic view of a track pattern produced by a helical scan tape drive having the new scanner architecture of FIG. 4 and a position error between head modules.
Figure 8:
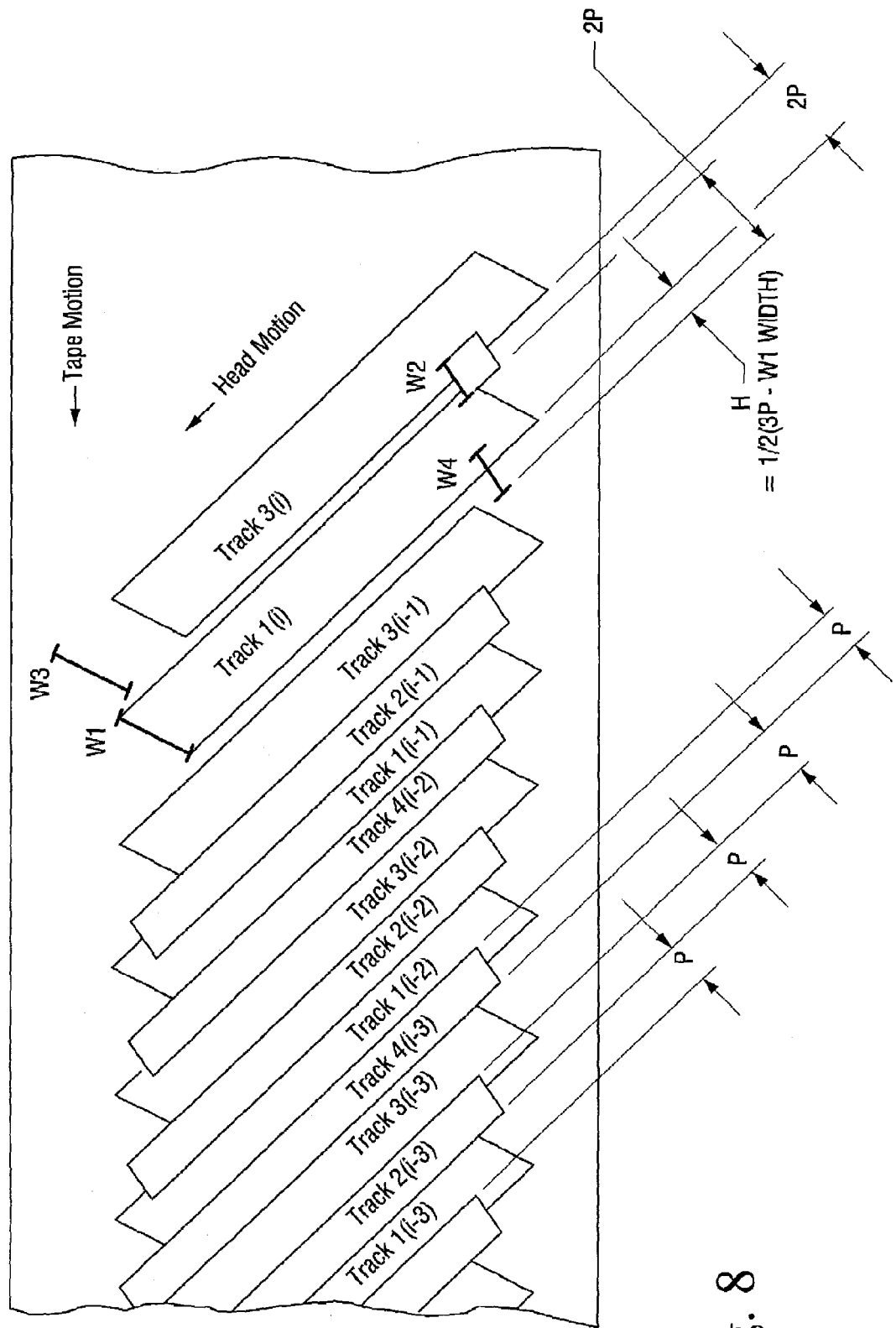
FIG. 8 is a diagrammatic view of a magnetic tape surface for a helical scan tape drive having the new scanner architecture of FIG. 7.
Figure 9:
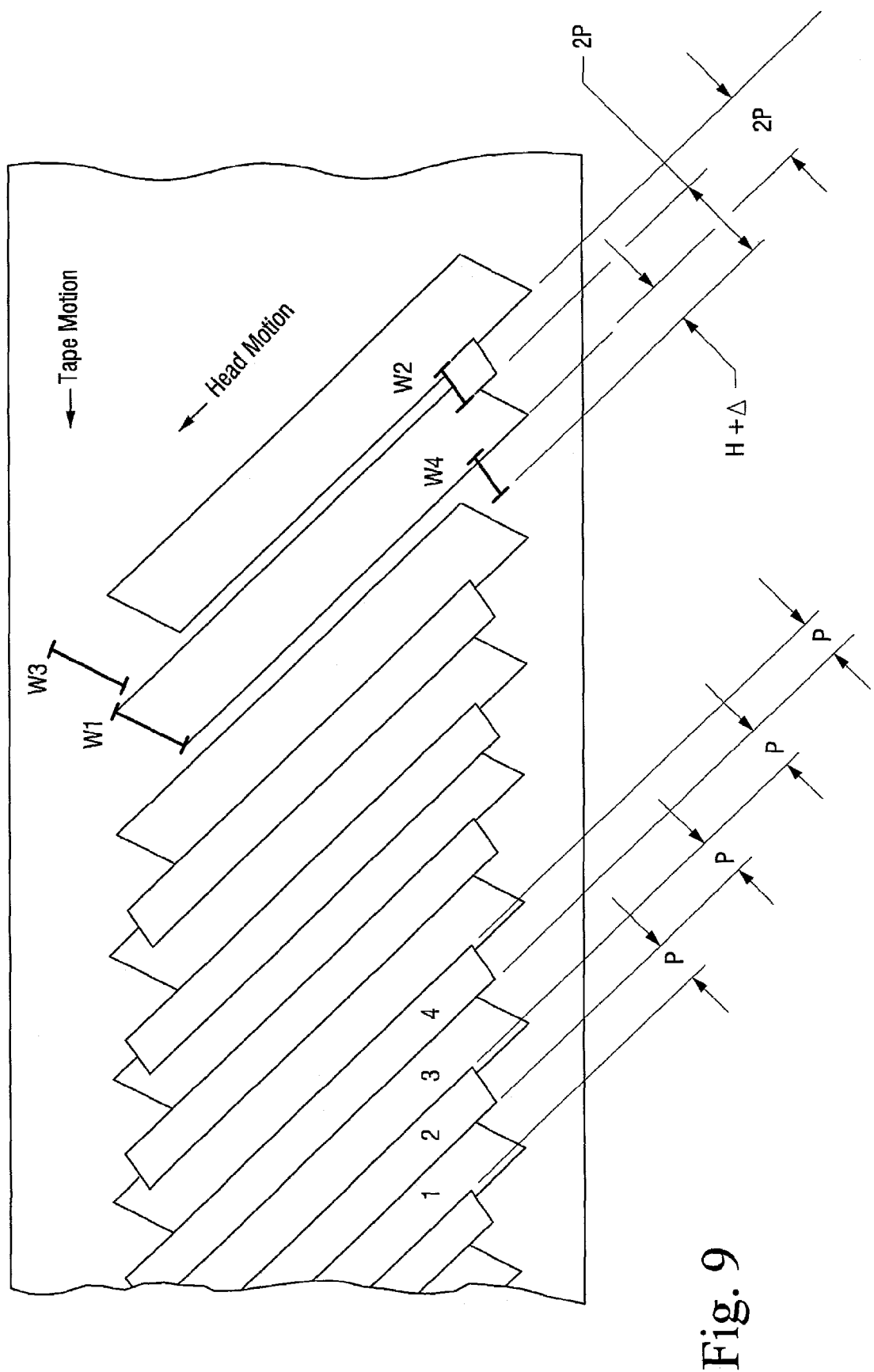
FIG. 9 is a diagrammatic view of a track pattern produced by a helical scan tape drive having the new scanner architecture of FIG. 7 and a position error between head modules.

In FIG. 6, the vertical height from the W1 head-to-the W2 head is such that the W2 head incorrectly follows a path not H, but rather a path H+Δ from the W1 head path. However, this incorrect head mounting has no effect on the final recorded pattern and the width of every recorded track is still P.

FIG. 7, FIG. 7A, FIG. 8, and FIG. 9 show an alternate embodiment wherein the W2 head is positioned above the W4 head rather than below the W4 head (e.g., the W2 head leads the W4 head rather than follow the W4 head). While the foregoing has been described using the Mammoth-2 format as an example and where the linear tape motion is in the same (general) direction as scanner head motion, in a similar manner the foregoing is also applicable to helical tape formats where the linear tape motion moves in a (general) direction opposite to the direction of scanner head motion (e.g., D-2 or Ampex DCT).

Figure 10:
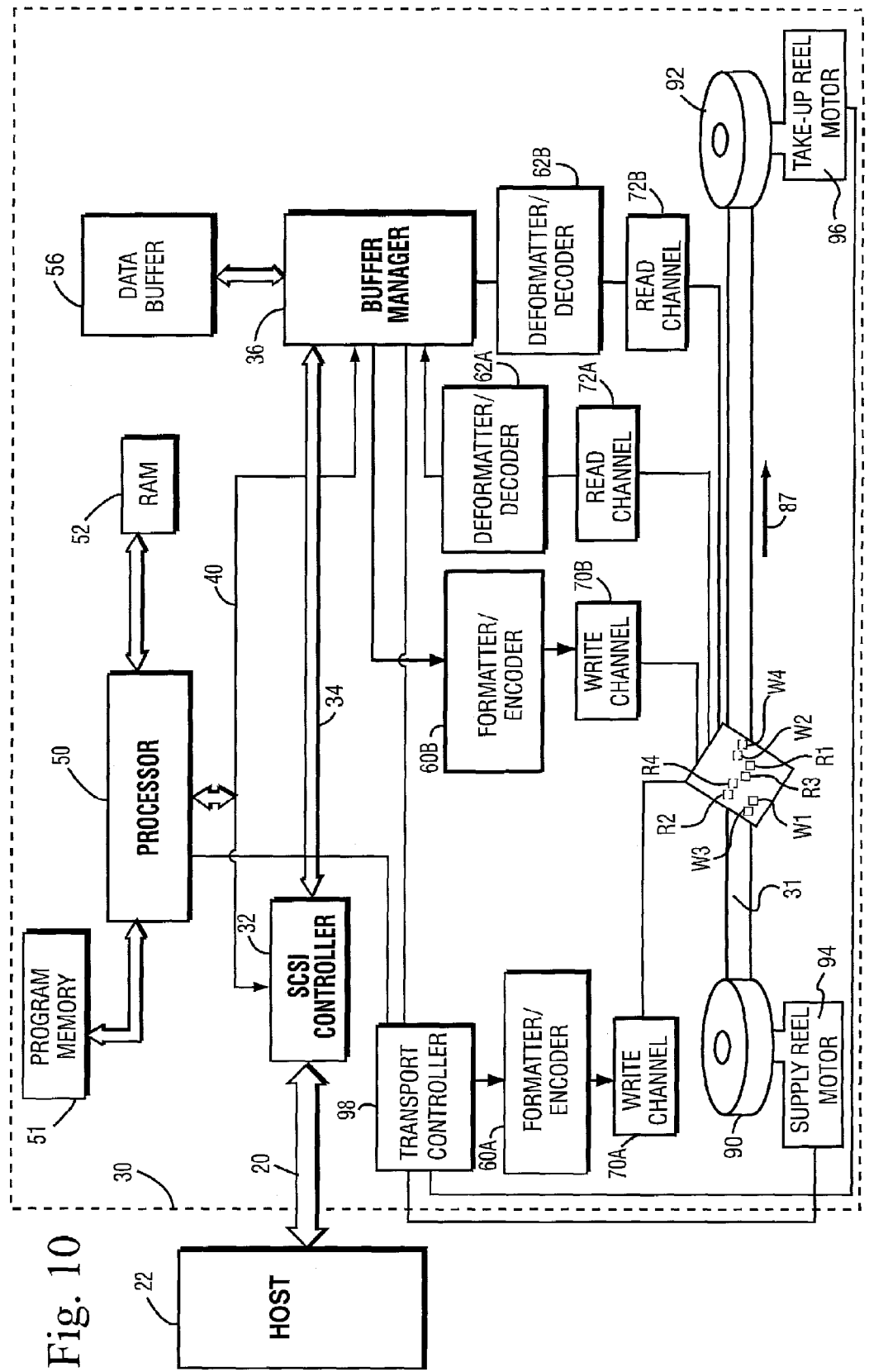
FIG. 10 is a schematic view of an example helical scan suitable for implementation of the new scanner architecture.

FIG. 10 illustrates an example, non-limiting, representative tape drive in which embodiments of the scanner configurations of the present invention can be deployed. FIG. 10 shows a SCSI bus 20 which connects a host computer 22 and a first embodiment of a SCSI target storage device, particularly tape drive 30. In the illustrated embodiment, an example tape drive 30 is shown as a generic helical scan tape drive which transduces information on/from tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to two formatter/encoders 60A, 60B and to two deformatter/decoders 62A, 62B. The formatter/encoder 60A is connected to a first write channel 70A (also known as write channel A), while the formatter/encoder 60B is connected to a second write channel 70B (also known as write channel B). The deformatter/decoder 62A is connected to a first read channel 72A (also known as read channel A), while the deformatter/decoder 62B is connected to a second read channel 72B (also known as read channel B).

The write channel 70A is connected to write heads W1 and W2, while the write channel 70B is connected to the write heads W3 and W4. Similarly, the read channel 72A is connected to read heads R1 and R2, while the read channel 72B is connected to read heads R3 and R4. The general criteria is that any channel (whether read or write) have only one head from any module active at any one time so the channel can be shared by the modules. So it would also be possible to have write channel 70A is connected to heads W1 and W4, while write channel B is connected to W3 and W2 (like shown in FIG. 7A). The same criteria applies for the read heads, e.g., read channel 72A could be connected to read heads R1 and R2 while read channel 72B could be connected to read heads R3 and R4. Alternatively, read channel 72A could be connected to read heads R1 and R4 while read channel 72B is connected to read heads R3 and R2.

Thus, the write head W1, W3 and W2, W4 and the read heads R1, R3 and R2, R4 are mounted on a peripheral surface of scanner 85, e.g., a rotatable drum or rotor. Tape 31 is wrapped around scanner 85 such that aforementioned heads follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around scanner 85.

In one embodiment, a supply reel 90 and take-up reel 92 are driven by respective reel motors 94 and 96 to transport tape 31 in the direction 87. Reel motors 94 and 96 are driven by transport controller 98, which ultimately is governed by processor 50. Operation and control of the tape transport mechanism of this second type of tape drive including reel motors 94 and 96 is understood by the person skilled in the art with reference, for example, to U.S. Pat. No. 5,680,269 and incorporated herein by reference. Alternatively or additionally, the transport system can include a capstan which imparts motion to the tape 31.

In addition to write heads and read heads, scanner 85 can also have certain unillustrated electronics mounted thereon. The scanner-mounted electronics are understood with reference to U.S. patent application Ser. No. 09/761,658, filed Jan. 18, 2001, entitled "PHASE BASED TIME DOMAIN TRACKING FOR HELICAL SCAN TAPE DRIVE", and U.S. patent application Ser. No. 09/492,345, filed Jan. 27, 2000, entitled "POWER SUPPLY CIRCUIT AND METHOD OF CALIBRATION THEREFOR", both of which are incorporated herein by reference in their entirety.

Advantageously, the magnetic recording apparatus and method described herein records/reproduces an alternating-azimuth recorded track pattern on tape and still provides an efficient electrical signal structure, yet the recorded track pattern is not adversely affected by the height error between independent groups of write heads.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the number of transducing heads in the first set and the second set may total more than four. While four heads have been described in a conveniently describable embodiment, the invention is not so limited.

What is claimed is:

1. A helical scan tape recorder comprising:
    a rotatable scanner upon which is mounted a first set of plural transducing heads and a second set of transducing heads;
    a transport system for transporting magnetic tape proximate the rotatable scanner in a manner so that information is transduced by at least one of the transducing heads during a revolution of the scanner;
    wherein the sets of transducing heads are so mounted on the scanner with respect to azimuthal orientation of the transducing heads that all tracks transduced by the transducing heads have a desired width regardless of an error in physical distance separating the sets of transducing heads;

wherein the first set of plural transducing heads comprises a first head and a third head wherein, the second set of plural transducing heads comprises a second head and a fourth head, and wherein the sets of transducing heads are mounted on the scanner so the first head and the third head transduce respective tracks during a first angular phase of the rotation of the scanner, and so that the second head and the fourth head transduce, during a second angular phase of the rotation of the scanner, respective tracks which partially overlap a previously-transduced track, wherein the tracks on the tape alternate according to differing azimuthal orientation; and wherein the sets of transducing heads are mounted on the scanner so the second head transduces a track which preferably resides a distance H below a track transduced by the first head, wherein $H=3P+\frac{1}{2}(P-W1)$, wherein P is a nominal width of the second head, and wherein W1 is a width of the first head.

2. The apparatus of claim 1, wherein the first set of transducing heads has a first azimuthal orientation and the second set of transducing heads has a second azimuthal orientation which is different from the first azimuthal orientation.

3. The apparatus of claim 1, wherein the sets of transducing heads are mounted on the scanner so the second head transduces a track which partially overlaps a track transduced by the first head and a track transduced by the third head.

4. The apparatus of claim 1, wherein the fourth head transduces a track which is preferably a distance 2P above the track transduced by the second head.

5. The apparatus of claim 1, wherein the first angular phase is offset from the second angular phase by essentially one hundred eighty degrees.

6. The apparatus of claim 1, wherein the first set of plural transducing heads and a second set of transducing heads are write heads.

7. A helical scan tape recorder comprising:

a rotatable scanner upon which is mounted a first set of plural transducing heads and a second set of transducing heads, the first set of transducing heads having a first azimuthal orientation and the second set of transducing heads having a second azimuthal orientation which is different from the first azimuthal orientation;

a transport system for transporting magnetic tape proximate the rotatable scanner in a manner so that information is transduced by at least one of the transducing heads during a revolution of the scanner;

wherein the sets of transducing heads are mounted on the scanner so the first set of plural transducing heads transduce relative to the tape their corresponding tracks during a first angular phase of the revolution of the scanner and the second set of plural transducing heads transduce relative to the tape their corresponding tracks during a second angular phase of the revolution of the scanner, with tracks transduced by the second set of second set of plural transducing heads partially overlapping on the tape at least one of the tracks transduced by the first set of plural transducing heads;

wherein the first set of plural transducing heads comprises a first head and a third head and the second set of plural transducing heads comprises a second head and a fourth head; and wherein the sets of transducing heads are mounted on the scanner so the second head transduces a track which resides a distance H below a track transduced by the first head, wherein $H=3P+\frac{1}{2}(P-W1)$, wherein P is a nominal width of the second head, and wherein W1 is a width of the first head.

8. The apparatus of claim 7, wherein the first angular phase is offset from the second angular phase by essentially one hundred eighty degrees.

9. The apparatus of claim 7, wherein the fourth head transduces a track which is a distance 2P above the track transduced by the second head.

10. The apparatus of claim 7, wherein the first set of plural transducing heads and a second set of transducing heads are write heads.

11. A helical scan tape recorder comprising:

a rotatable scanner upon which is mounted a first set of plural transducing heads and a second set of transducing heads, the first set of plural transducing heads comprising a first head and a third head, the second set of plural transducing heads comprising a second head and a fourth head;

a transport system for transporting magnetic tape proximate the rotatable scanner in a manner so that information is transduced by at least one of the transducing heads during a revolution of the scanner;

wherein the sets of transducing heads are mounted on the scanner so the first head and the third head transduce respective tracks during a first angular phase of the rotation of the scanner, and so that the second head and the fourth head transduce, during a second angular phase of the rotation of the scanner, respective tracks which partially overlap a previously-transduced track, and wherein the tracks on the tape alternate according to differing azimuthal orientation;

wherein the sets of transducing heads are mounted on the scanner so the second head transduces a track which resides a distance H below a track transduced by the first head, wherein $H=3P+\frac{1}{2}(P-W1)$, wherein P is a nominal width of the second head, and wherein W1 is a width of the first head.

12. The apparatus of claim 11, wherein the first set of transducing heads has a first azimuthal orientation and the second set of transducing heads has a second azimuthal orientation which is different from the first azimuthal orientation.

13. The apparatus of claim 11, wherein the sets of transducing heads are mounted on the scanner so the second head transduces a track which partially overlaps a track transduced by the first head and a track transduced by the third head.

14. The apparatus of claim 11, wherein the fourth head transduces a track which is a distance 2P above the track transduced by the second head.

15. The apparatus of claim 11, wherein the first angular phase is offset from the second angular phase by essentially one hundred eighty degrees.

16. The apparatus of claim 11, wherein the first set of plural transducing heads and a second set of transducing heads are write heads.

17. A method of operating a helical scan tape recorder comprising:

rotating a scanner upon which is mounted a first set of plural transducing heads and a second set of transducing heads;

transporting magnetic tape proximate the rotatable scanner in a manner so that information is transduced by at least one of the transducing heads during a revolution of the scanner;

the sets of transducing heads being so mounted on the scanner with respect to azimuthal orientation of the transducing heads that all tracks transduced by the transducing heads have a desired width regardless of an error in physical distance separating the sets of transducing heads;

wherein the first set of plural transducing heads comprises a first head and a third head, wherein the second set of plural transducing heads comprises a second head and a fourth head, and wherein the sets of transducing heads are mounted on the scanner so the first head and the third head transduce respective tracks during a first angular phase of the rotation of the scanner, and so that the second head and the fourth head transduce, during a second angular phase of the rotation of the scanner, respective tracks which partially overlap a previously-transduced track, and wherein the tracks on the tape alternate according to differing azimuthal orientation;

the second head transducing a track which preferably resides a distance H below a track transduced by the first head, wherein H=3P+½(P−W1), wherein P is a nominal width of the second head, and wherein W1 is a width of the first head.

18. The method of claim 17, wherein the first set of transducing heads has a first azimuthal orientation and the second set of transducing heads has a second azimuthal orientation which is different from the first azimuthal orientation.

19. The method of claim 17, wherein the sets of transducing heads are mounted on the scanner so the second head transduces a track which partially overlaps a track transduced by the first head and a track transduced by the third head.

20. The method of claim 17, further comprising the fourth head transducing a track which is preferably a distance 2P above the track transduced by the second head.

21. The method of claim 17, wherein the first angular phase is offset from the second angular phase by essentially one hundred eighty degrees.

22. The method of claim 17, wherein the first set of plural transducing heads and a second set of transducing heads are write heads.

23. A method of operating a helical scan tape recorder comprising:

rotating a scanner upon which is mounted a first set of plural transducing heads and a second set of transducing heads, the first set of transducing heads having a first azimuthal orientation and the second set of a transducing heads having a second azimuthal orientation which is different from the first azimuthal orientation;

transporting magnetic tape proximate the rotatable scanner in a manner so that information is transduced by at least one of the transducing heads during a revolution of the scanner;

the sets of transducing heads being mounted on the scanner so the first set of plural transducing heads transduce relative to the tape their corresponding tracks during a first angular phase of the revolution of the scanner and the second set of plural transducing heads transduce relative to the tape their corresponding tracks during a second angular phase of the revolution of the scanner, with tracks transduced by the second set of second set of plural transducing heads partially overlapping on the tape at least one of the tacks transduced by the first set of plural transducing heads;

wherein the first set of plural transducing heads comprises a first head and a third head and the second set of plural transducing heads comprises a second head and a fourth head;

the second head transducing a track which resides a distance H below a track transduced by the first head, wherein H=3P+½(P−W1), wherein P is a nominal width of the second head, and wherein W1 is a width of the first head.

24. The method of claim 23, wherein the first angular phase is offset from the second angular phase by essentially one hundred eighty degrees.

25. The method of claim 23, further comprising the fourth head transducing a track which is a distance 2P above the track transduced by the second head.

26. The method of claim 23, wherein the first set of plural transducing heads and a second set of transducing heads are write heads.

27. A method of operating a helical scan tape recorder comprising:

rotating a scanner upon which is mounted a first set of plural transducing heads and a second set of transducing heads, the first set of plural transducing heads comprising a first head and a third head, the second set of plural transducing heads comprising a second head and a fourth head;

transporting magnet tape proximate the rotatable scanner in a manner so that information is transduced by at least one of the transducing heads during a revolution of the scanner;

the sets of transducing heads being mounted on the scanner so the first head and the third head transduce respective tracks during a first angular phase of the rotation of the scanner, and so that the second head and the fourth head transduce, during a second angular phase of the rotation of the scanner, respective tracks which partially overlap a previously-transduced track, and wherein the tracks on the tape alternate according to differing azimuthal orientation;

the second head transducing a track which resides a distance H below a track transduced by the first head, wherein H=3P+½(P−W1), wherein P is a nominal width of the second head, and wherein W1 is a width of the first head.

28. The method of claim 27, wherein the first set of transducing heads has a first azimuthal orientation and the second set of transducing heads has a second azimuthal orientation which is different from the first azimuthal orientation.

29. The method of claim 27, wherein the sets of transducing heads are mounted on the scanner so the second head transduces a track which partially overlaps a track transduced by the first head and a track transduced by the third head.

30. The method of claim 27, further comprising the fourth head transducing a track which is a distance 2P above the track transduced by the second head.

31. The method of claim 27, wherein the first angular phase is offset from the second angular phase by essentially one hundred eighty degrees.

32. The method of claim 27, wherein the first set of plural transducing heads and a second set of transducing heads are write heads.

* * * * *